June 20, 1933. H. L. KRAEFT 1,914,810
METHOD OF MAKING CYCLE FRAMES
Filed May 29, 1930
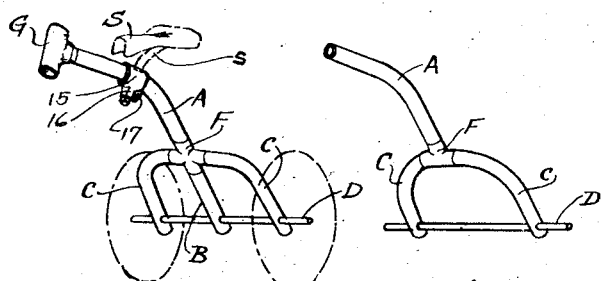
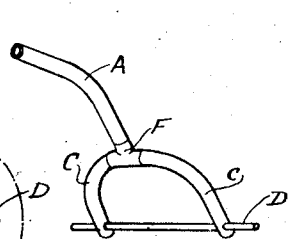
Fig. 1
Fig. 2
Fig. 3a
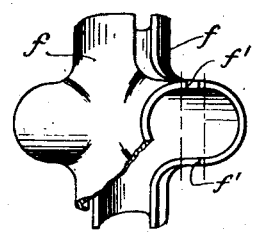
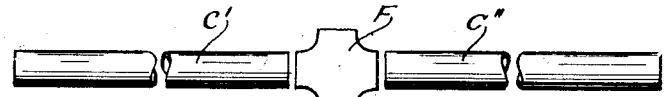
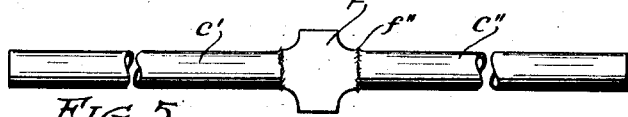
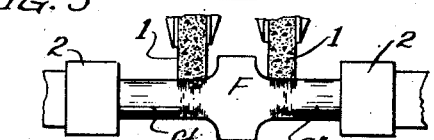
Fig. 3
Fig. 4
Fig. 5
Fig. 6
Fig. 7
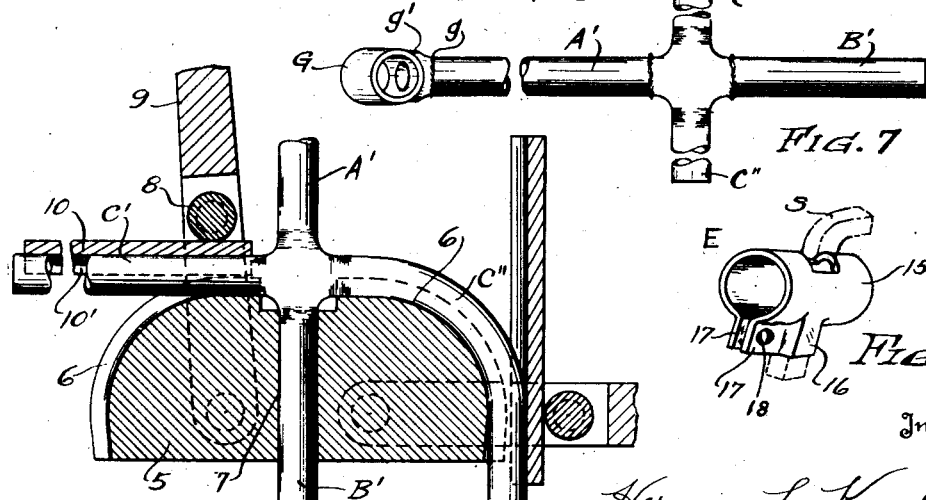
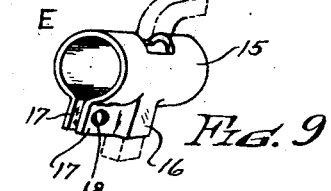
Fig. 8
Fig. 9
Inventor
Herman L. Kraeft
By Bates, Goldick & Pease
Attorney Patented June 20, 1933

1,914,810

UNITED STATES PATENT OFFICE

HERMAN L. KRAEFT, OF CLEVELAND, OHIO, ASSIGNOR TO MURRAY-OHIO MANUFACTURING COMPANY, OF CLEVELAND, OHIO, A CORPORATION OF OHIO

METHOD OF MAKING CYCLE FRAMES

Application filed May 29, 1930. Serial No. 457,255.

This invention relates to a frame construction, particularly for juvenile vehicles, such as tricycles and a novel method of making such structures.

An object is to provide a strong and rigid frame structure for a tricycle or the like, made from a plurality of tubular pieces.

Another object is to provide a novel method of forming a tubular frame, and specifically to weld and form a frame from a plurality of pieces in a more expeditious manner. More specifically, an object is to provide an inexpensive yet entirely serviceable tricycle frame, and an efficient method of making the same.

Other objects and the various novel features of the invention will appear in the detailed description to follow and wherein I show the preferred order of carrying out the method and the preferred embodiment of the invention generally. The essential characteristics of the invention are set forth in the claims.

In the drawing, Figs. 1 and 2 are perspective views of tricycle frames in accordance with the invention; Fig. 3 is an exploded view of two parts forming one type of joint or connection between the main frame elements; Fig. 3a is a perspective view of one part of still another joint or connection, adapted particularly to serve as the steering column, or steering fork stem support; Figs. 4 to 7 show steps in the method of assembling and forming the frame; Fig. 8 is an exemplary sectional view of suitable apparatus for bending two of the parts of the frame, the frame being shown in plan, and Fig. 9 is a perspective view of the seat post clamp arrangement I propose to use.

In Figs. 1 and 2 of the drawing, two general types of tricycle frames are illustrated. Fig. 1 shows a center frame member A supporting a seat S and provided with a crossbeam structure comprising arms C for supporting an axle D. The center frame is extended rearwardly at B beyond a connecting joint member F of the "cross" type, to lend additional support for the axle. At its forward end the center frame member, has a tubular T head G forming the main support for a front wheel fork stem or spindle (not shown). In Fig. 2, the general arrangement is the same except that the extension B is omitted and a T or Y type of connecting fitting is used for the center frame and crossbeam parts. In both types of construction the cross-beam arms are bent beyond the connecting fitting in order to provide spaced apart and substantially parallel bearing supports for the axle. The center frame is also bent, near the seat, providing an arch effect for properly supporting the seat.

It is my understanding that the common practice has been to employ cast fittings as connections for the tubular frame elements illustrated, and, at least in the event of welding the various parts, to form the various bends in the tubular elements before assembly. I propose to form all the main or essential parts from tube and sheet stock by butt-welding, preferably electric resistance welding, and to radically change from the usual procedure with relation to forming and securing the tubes to make up the frame. The invention contemplates making the tube connecting members of two substantially complementary sheet metal stampings or punchings, butt-welded together, then attaching the tubes, cut from straight stock, by butt-welding, and afterward placing the necessary or desired bends in the tubes to make the frame the desired shape. So far as I know, this constitutes an entirely new procedure in making up tricycle and like frames.

In Fig. 3 are shown two halves of a "cross" type tube connection. These are substantially alike and designated f. The adjacent edges of the semi-cylindrical portions (as shown) are extended slightly past a half circle as at f' to provide welding stock. The two halves may be inserted into suitably recessed welding blocks suitably mounted on a resistance welding machine, and the halves welded together by feeding and controlling electric current to the blocks; meanwhile forcing the same toward each other. The "flash" of the seam may be afterward ground off or otherwise removed, resulting in a substantially integral symmetrical connection member, such as shown at F in Fig. 1.

The tube connection, or steering column member G for the frame is, or may be, made in essentially the same manner as the member F. Fig. 3a represents one of the formed sheet metal parts of the steering column member, the complementary part being, of course, substantially the reverse of the one illustrated. This member G is, of course, suitably reamed out or finished out on its inside surfaces near the ends of the two branches, and at any stage of the process to support the usual fork stem bearings, not shown.

Assuming the connection F has been made as above described, or insofar as the remainder of the process is concerned, in any suitable manner, straight sections of suitable tubing are now butt-welded to opposite termini of the connection. In Fig. 4, there are two tube sections C' and C" in proper position to start welding the same onto the member F. The tubes are cut or supplied in lengths slightly greater than necessary to form the frame-arms in order to be sure of enough welding stock and are preferably moved up in suitable sliding supports, such as resistance welding blocks of a welding machine, until the end of one tube abuts the connection F, whereupon the welding action takes place and is finished as the blocks approach still further, as is well known in the electric welding art. Both tubes may be welded onto the connection at once or one following the other.

The flash f" is now removed by mounting one or both tubes C' and C" in a suitable fixture, such as a grinding head or heads and the tubes turned, presenting the flash to a tool, such as a grinding wheel. Two of such wheels are shown at 1, and suitable rotary supports, chucks for example, at 2, for the tubes.

The above described procedure is now repeated to secure tube stock at A' and B' to form the remaining main frame parts, the section of tube at A' preferably being straight, as in the case of the parts C' and C". The arm parts just mentioned do not interfere with removing the flash between the members A' and B' and the member F, as will be obvious, and the same support may be used as in Fig. 6 and similar grinding or like tools for this operation.

It will be understood from the above that the member G is also butt-welded to the outer end of the tube section A', as at g, Fig. 7. This may be done before the tube A' is secured to the connection F or afterward, as desired. The member G, it will be seen, has its upright branches formed on a larger diameter than the branch which is welded to the tube A', and there is a shoulder or reduced effect at g' leading to the smaller diameter. This illustrates what may be done in the case of the member F if desired, to give it, at least the appearance of, greater strength. Illustration of such modification of the member F is not deemed necessary.

The necessary or desired bending of the tubes is now effected in any suitable manner. In Fig. 8, there is shown a suitable heavy block 5 arcuately grooved on one end and the opposite sides, as at 6, to receive the arms C and C", the former being shown in position for bending and the latter completely formed. The block may be suitably apertured at 7 to receive the extension B' and, of course, is itself very rigidly carried on a suitable frame or base (not shown). The bending may be carried out by rollers 8 on swingable arms 9 pivoted to the block 5 on axes corresponding to the center of the arcs on which the arms are to be formed. It is possible to effect very uniform bends in the arms by using separate straight bending shoes 10 recessed, as at 10', to substantially fit the stock to be bent, these simply swinging around under the roller as the latter travel around to form the bend. Both bends may, of course, be effected simultaneously. The desired bend in the tube A' to form the arched effect of the part A in Fig. 1 may now be made in any suitable way, as will be obvious.

Drilling or piercing the tubes B and C for the axle is preferably done as substantially a last operation. This may, however, be done while the parts are supported, as in Fig. 8, after the arms are bent. The arms C are preferably drilled from opposite directions, each operation being continued to drill through one wall of the extension B.

The steps of forming a frame such as shown in Fig. 2 may be substantially as above described, simply omitting the step of welding the central frame extension, as will be obvious.

If desired, for some frames, it is entirely practical to merely weld the various tubes together directly in intersecting relationship, and afterward, bend whichever members are required to be bent. In such case, connecting members, such as F, would be simply omitted.

Referring particularly to Figs. 1 and 9, a suitable seat post supporting and securing clamp arrangement may comprise the sheet metal member E. As shown, the seat has a bent post s of suitable rectangular cross section adapted to extend through elongated openings (not shown) in the center frame member A, the openings being of sufficient extent to permit the desired adjustment of the seat. The member E may comprise a single section of sheet metal formed cylindrically at 15 to embrace the tube A and with substantially rectangular portions 16 at the lower free edges to embrace the lower end of the post. The member E may, however, comprise two simple sheet metal stampings spot welded together in the manner illustrated in connection with the center bar and cross beam connection F.

Extending from both the cylindrical and rectangular portions and in mutually overlying relationship are ear portions 17 suitably apertured, as at 18, to receive a clamping bolt, not shown. When such clamping bolt is drawn down on the ears, bringing them toward each other, both the seat post and tube A to hold both in rigid relationship.

It will be seen that by making the frame herein shown, and like structures, in accordance with the above, a great deal of time is saved over previous practices, resulting in greater cost economy and more speedy production. The tube stock in straight formation is easily handled in practically all welding machines and apparatus, whereas if the stock is bent before welding, then the machine requires very special fixtures, and moreover the stock cannot be advanced (during welding) beyond a predetermined point or the frame will be of the wrong dimensions. The formation of openings, such as for the axle D, is, moreover, better accomplished after the frame has been formed, since it is easier, by the use of suitable jigs (not shown), to obtain true alignment of the various openings.

It will be understood that, insofar as the invention is not limited by the claims, each unitary part or series of steps comprising the present invention may be modified with reference to the other parts or steps, and other unessential changes made, as required in practice.

I claim:

1. The method of forming tubular armed frames, comprising electrically butt-welding straight sections of tubing to a connecting fitting, and thereafter bending one or more of said sections, at a point exactly spaced from said fitting.

2. The method of forming tubular armed frames, comprising butt-welding substantially complementary sheet metal members together to form a connecting fitting, thereafter butt-welding the arm members to the extremities of the fitting, and thereafter bending one or more of the arms, at a predetermined distance from the fitting.

3. The method of forming tricycle frames, which includes welding a pair of substantially straight tubes to a connecting fitting, supporting the tubes adjacent a suitable tool to remove the irregularities due to welding, and thereafter bending the extremities of the tubes into substantially parallel and exactly spaced relationship to support the axle, and drilling the parallel portions of the tubes for proper alignment of axle supporting openings.

4. The method of forming butt-welded frames requiring in a tubular member thereof a bend exactly spaced from the welded end of the member, comprising butt-welding the end of a straight section of tubing to make a desired joint, and thereafter bending the tubing at the exact point required.

5. The method of forming welded frames comprising welding the end of a straight member to a connecting fitting securing the fitting in a die block, and bending the member at a fixed distance from the weld.

In testimony whereof, I hereunto affix my signature.

HERMAN L. KRAEFT.